No. 813,530. PATENTED FEB. 27, 1906.
M. H. SPEAR.
APPARATUS FOR HOLDING, TURNING, THREADING, AND CUTTING PIPES.
APPLICATION FILED OCT. 23, 1903.

4 SHEETS—SHEET 1.

WITNESSES.
INVENTOR
Murray Hinckley Spear
by Foster Freeman and Watson
attorneys.

No. 813,530. PATENTED FEB. 27, 1906.
M. H. SPEAR.
APPARATUS FOR HOLDING, TURNING, THREADING, AND CUTTING PIPES.
APPLICATION FILED OCT. 23, 1903.

4 SHEETS—SHEET 2.

WITNESSES.
John Gillman, Jr.
J. J. McCarthy

INVENTOR
Murray Hinckley Spear
by Foster Freeman Watson
attorneys.

No. 813,530. PATENTED FEB. 27, 1906.
M. H. SPEAR.
APPARATUS FOR HOLDING, TURNING, THREADING, AND CUTTING PIPES.
APPLICATION FILED OCT. 23, 1903.
4 SHEETS—SHEET 3.
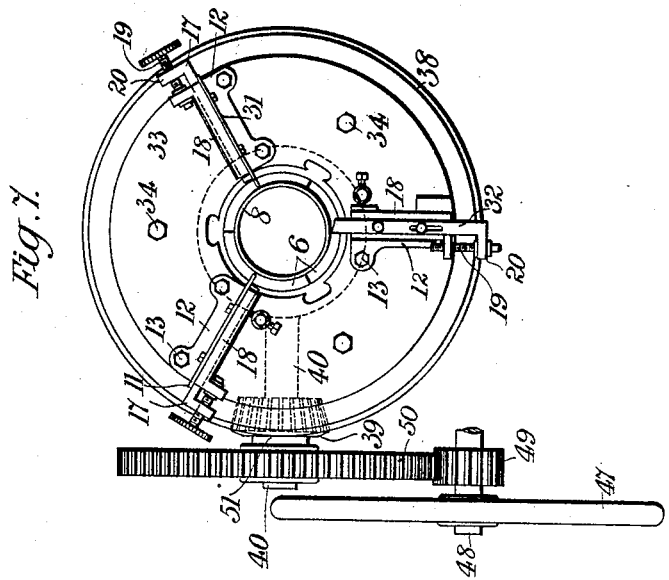
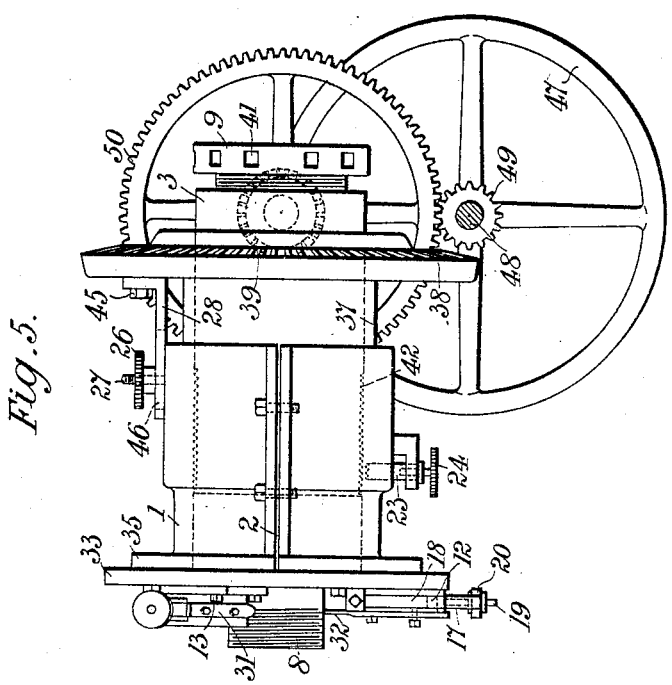
WITNESSES.
INVENTOR
Murray Hinckley Spear No. 813,530. PATENTED FEB. 27, 1906.
M. H. SPEAR.
APPARATUS FOR HOLDING, TURNING, THREADING, AND CUTTING PIPES.
APPLICATION FILED OCT. 23, 1903.
4 SHEETS—SHEET 4.
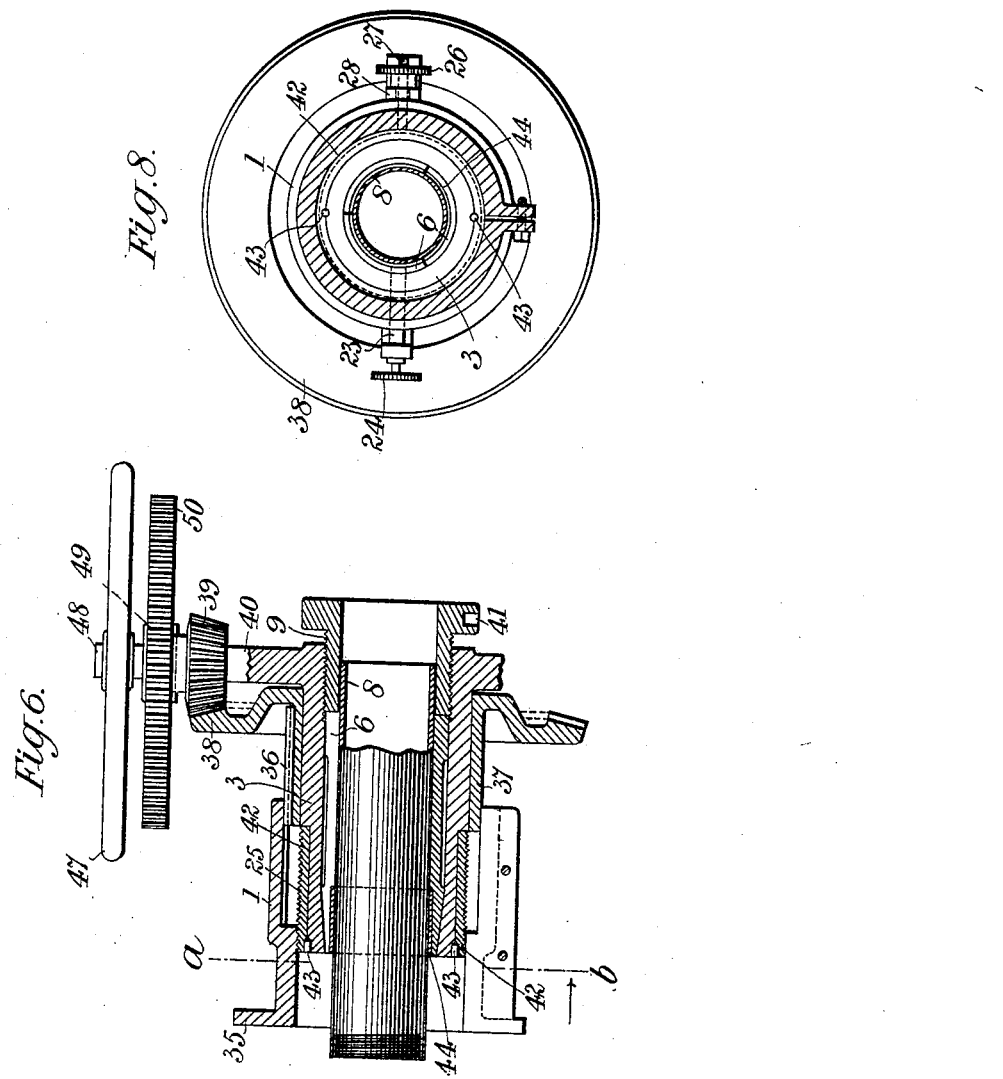
WITNESSES.
INVENTOR
Murray Hinkley Spear
by Foster Freeman & Watson
Attorneys

UNITED STATES PATENT OFFICE.

MURRAY HINCKLEY SPEAR, OF LONDON, ENGLAND, ASSIGNOR, BY DIRECT AND MESNE ASSIGNMENTS, TO BARRINGTON ELLIOTT BURROWES, OF LONDON, ENGLAND.

APPARATUS FOR HOLDING, TURNING, THREADING, AND CUTTING PIPES.

No. 813,530.     Specification of Letters Patent.     Patented Feb. 27, 1906.

Application filed October 23, 1903. Serial No. 178,230.

*To all whom it may concern:*

Be it known that I, MURRAY HINCKLEY SPEAR, a subject of His Majesty the King of Great Britain, residing at London, England, have invented a certain new and useful Improvement in Apparatus for Holding, Turning, Threading, and Cutting Pipes and the Like, of which the following is a specification.

The invention relates to apparatus for holding, turning, threading, and cutting pipes, and has for its object to provide an apparatus wherein the ordinary dies are dispensed with and the three above-mentioned operations effected without disturbing the work, wherein the turning and threading may be performed simultaneously and wherein threads of any denomination and pitch may be cut upon pipes of either hard or soft metal. No independent pipe-vise is needed, and the work is in full view of the operator throughout its progress.

The apparatus will be readily understood by referring to the accompanying drawings, wherein two forms of my improved apparatus are shown, one for turning, threading, and cutting pipes of small diameter by hand, and for turning, threading, and cutting pipes of larger diameters either by hand or power, as desired.

Figure 1:
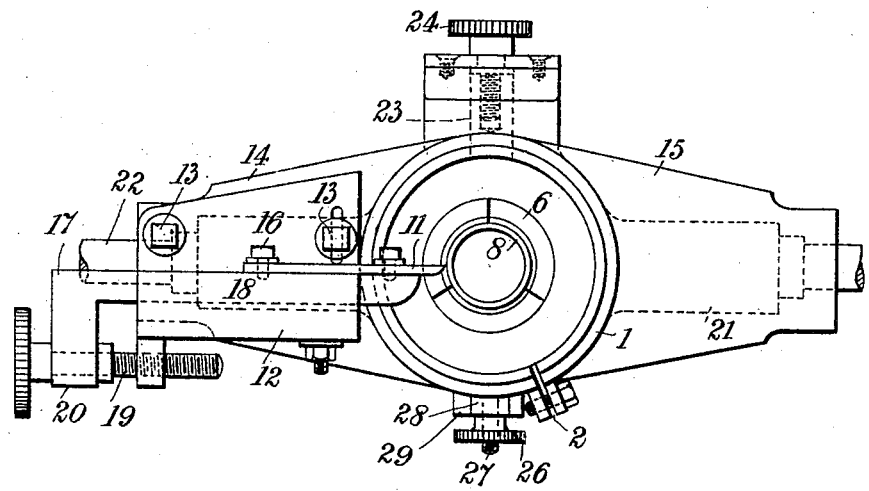
Figure 2:
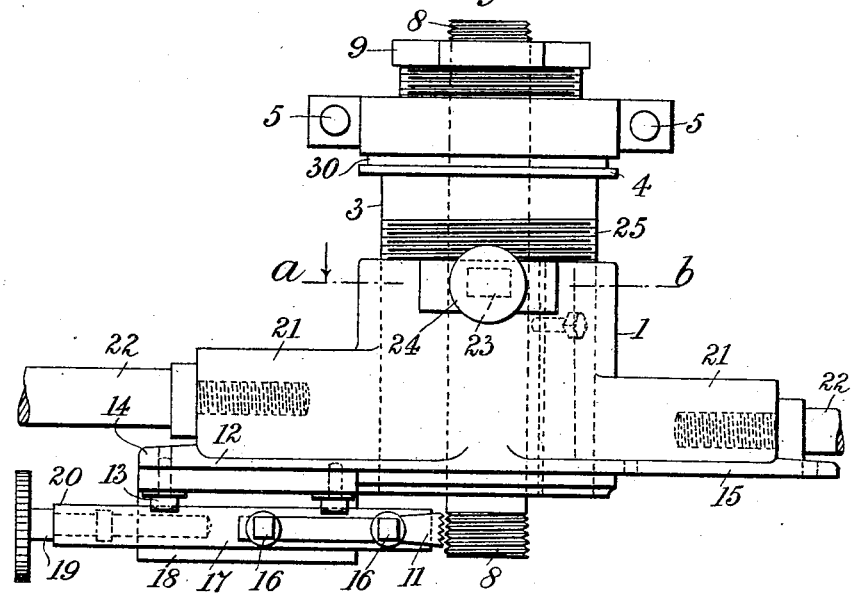
Figure 3:
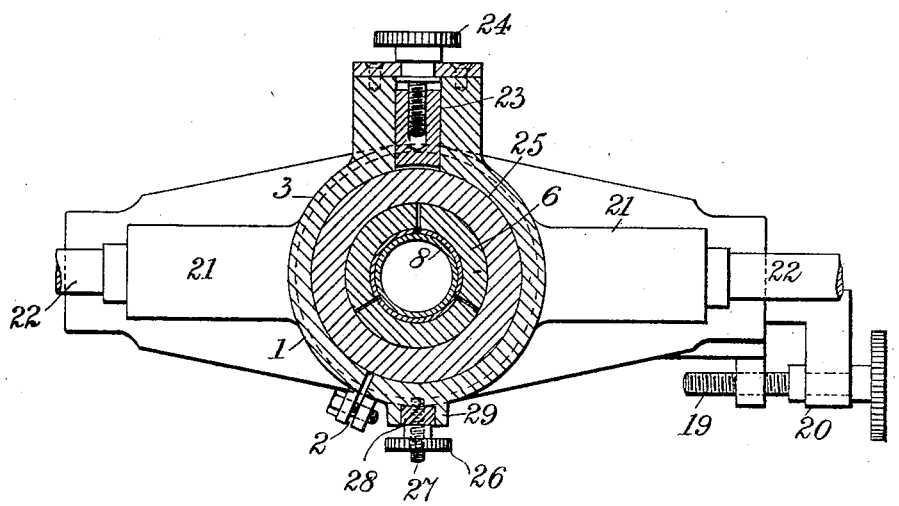
Figure 4:
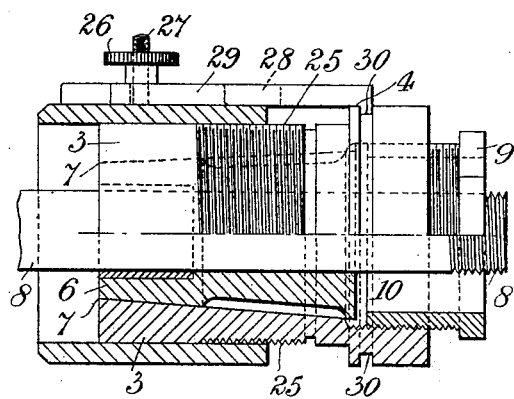

Figure 1 is an end elevation of an apparatus for turning, threading, and cutting pipes of small diameter, showing a chasing-tool and tool-holder in position. Fig. 2 is a plan thereof. Fig. 3 is a transverse section on line *a b* of Fig. 2. Fig. 4 is a longitudinal half-section through the cylinder and part of the outer sleeve. Fig. 5 is a side elevation of an apparatus for turning, threading, and cutting pipes of large diameters, adapted for operation by either hand or power. Fig. 6 is a sectional plan with tool-carrying plate removed. Fig. 7 is an end elevation with tool-carrying plate bolted in position. Fig. 8 is a transverse section on line *a b* of Fig. 6 with the gearing removed.

Similar numerals of reference indicate similar parts on all the figures of the drawings.

The apparatus comprises in the case of the smaller pipes an outer loose sleeve 1 in the form of a casting, which is split, as shown at 2, Fig. 1, to allow for expansion due to wedges, within which is fitted a fixed cylinder 3, having a flange 4 at one end to abut against the end of the aforesaid outer sleeve. The said cylinder is coned or tapered internally at one end for the reception of a series of wedges 6, the coned faces 7 of which correspond with the end or tapered interior of the cylinder 3 which contains them. The said wedges 6 are adapted to embrace the pipe 8 to be operated upon and grip the latter firmly with a pressure which is evenly distributed over the surface thereof. The wedges are forced home against the coned interior of the cylinder by means of a screwed nut 9, screwed into the flanged end of the cylinder and abutting against one end 10 of the said wedges, or any other convenient means may be employed.

The tool 11 is carried on a bracket 12, fastened by bolts 13 to flanges or extensions 14 and 15 of the outer sleeve, and the said tool is adjustably mounted by means of screws 16 to a sliding arm 17, carried in guides 18, formed on the bracket aforesaid, and is fed to the work by means of a feeding-screw 19, carried in a lug 20 upon the arm 17.

When it is desired to reverse the thread upon the pipe, the tool-bracket may be reversed and screwed to the opposite extension 15 of the outer sleeve 1. Where the pipe is very rough, a turning-tool may be screwed to the second extension 15 and the pipe turned down in advance of the threading operation, or both operations may be performed simultaneously.

In this improved apparatus the work is held stationary in any convenient manner, such as by bolts, through lugs 5, cast or formed on the cylinder 3 to any suitable base, and the tool rotated by the rotation of the outer sleeve 1, sockets 21 being cast thereon for the reception of handles or levers 22. The necessary travel of the tool to cut the thread is imparted by means of a screw-block 23, which is lowered by a milled nut 24 or other convenient means through the outer sleeve 1, by which it is carried into engagement with a thread 25 of corresponding pitch cut upon the outer surface of the cylinder 3, which holds the work. It will therefore be seen that when it is desired to cut a thread upon the pipe by means of the chasing-tool the sleeve 1, which carried the latter, is rotated by means of the hand-levers 22, and by reason of the screw-block 23 being in engagement with the thread 25 on the cylinder 3 the necessary travel is imparted to the tool for the purpose.

When it is desired to cut off a length of pipe, a parting-tool is substituted for the chaser, and the screw-block 23 is raised out of engagement with the screw-thread 25 on the cylinder. The sleeve 1 is now free to slide upon the said cylinder and is so slid until the parting-tool is opposite the place of division of the pipe. The tool is then adjusted by means of the feeding-screw 19, and the tool and sleeve are held in position by the tightening up of a nut 26, traveling upon a screw 27, mounted on the sleeve 1, said nut being tightened upon a slotted bar 28, sliding in guides 29, also mounted upon the sleeve 1. The opposite end of the bar 28 engages and travels in an annular slot or groove 30, cut in the flange 4 of the cylinder, so that the sleeve 1 is simply rotated in the position fixed by the nut 26, which thus locks the sleeve against any longitudinal movement on the cylinder.

Instead of cutting the thread 25 directly upon the cylinder 3 it may be cut upon a separate cylinder which, in the form of a false bush, is adapted to be keyed to the cylinder 3, so that when it is desired to cut threads of other pitches on pipes it is only necessary to substitute different-threaded false bushes on the cylinder 3, the screw-blocks and chasing-tools being correspondingly changed to suit.

The apparatus illustrated in Figs. 5, 6, 7, and 8 is similar in some respects to that already described, but is adapted to be operated either by hand or power and is for operating upon pipes of large diameter.

The outer sleeve 1 is split at 2, as before described, to take up wear and also to allow for expansion when tightening on the pipe 8. The brackets 12, carrying the tools 11, 31, and 32, are bolted by bolts 13 to a carrying-plate 33, which is in turn bolted by bolts 34 to a flange 35 on the outer sleeve 1. The outer sleeve 1 is adapted, by means of a spline or feather 36, to slide longitudinally upon an inner sleeve 37, capable of rotary motion only upon a fixed cylinder 3, and said inner sleeve has bolted or cast upon its outer end a bevel-wheel 38, the teeth of which engage a bevel-pinion 39, mounted upon a fixed shaft 40, cast or fixed upon the aforesaid cylinder 3, whereby rotary motion is imparted to the said inner sleeve 37 through the aforesaid spline or feather, the outer sleeve 1 being also rotated, carrying with it the tool-carrying plate and tools, the work being held stationary.

The work is firmly held as in the before-described machine by coned wedges 6, which fit into the cylinder 3, one end of which is internally coned to correspond to the said wedges, which are driven home to grip the work by means of a screwed nut 9, as before described, turning-holes 41 or other means being provided in the flange thereof to obtain the necessary power.

The inner end of the cylinder 3 is fitted on its outer surface with false bushes 42, upon which a screw-thread 25 of the pitch which it is desired to cut upon the work is formed, and the said bushes 42 are held upon the cylinder against slipping by set-screws 43. A screw-block 23 is mounted upon the outer sleeve 1, (through which it passes,) the thread upon which is adapted to engage the thread 25 on the aforesaid false bush, and thus impart longitudinal travel to the tool-carrying plate 33 and tools thereon. To vary the thread upon the work, therefore, it is only necessary to change the bushes, the screw-block, and the chaser-tool to correspond, as previously described.

In order that the machine may take pipes of various diameters, false bushes 44 may also be fitted to the inner surfaces of the coned wedges for a sufficient distance to insure a good grip being obtained.

When cutting off a length of pipe, a similar arrangement is adopted to that in the smaller apparatus first described, a slotted bar 28 being bolted at 45 to the bevel-wheel 38 and a screw 27 mounted on the outer sleeve and passing through the slot 46 of the bar 28, said screw being provided with a milled nut 26, adapted to be tightened down upon the bar in the desired position for cutting off, the screw-block 23 having first been raised out of engagement with the threaded bush 42 of the cylinder.

Three tools are shown in Fig. 7 mounted upon the tool-carrying plate—a turning-tool 31, a threading or chasing tool 11, and a parting-tool 32, all of which are detachable and adjustable to any desired position in brackets 12, bolted to the tool-plate, and are fed to the work by feeding-screws 19, which may be operated by hand or automatically in any convenient way.

The fixed part of the apparatus may be mounted in standards or in any convenient framing, which would carry the gears to obtain the necessary power. The gears, as shown are adapted for hand-power. A hand driving-wheel 47 is keyed to a shaft 48, carrying a pinion 49, gearing with a spur-wheel 50 on a sleeve 51 on the fixed shaft 40, said sleeve carrying also keyed thereto the bevel-pinion 39, which in turn gears with the bevel-wheel 38, fixed to the inner sleeve 37.

By the use of my improved apparatus pipes of large diameters may be easily operated upon by hand. They may be turned up and threads of any denomination and pitch cut thereupon and any length of pipe cut off, and where desired the first two operations may be performed simultaneously. The work is more accurately performed than by existing machines and is in full view of the operator. No pipe-vise is needed, the work being held stationary by the machine itself, and hard or soft metal pipes can be operated upon with equal facility.

Various modifications may be made in the construction, combinations, and arrangements of the various parts without, however, in any wise departing from the main features of the invention.

What I claim is—

1. In apparatus for holding, turning, threading and cutting pipes, and in combination, an outer loose sleeve carrying the tools, an inner fixed cylinder carrying the work and having an annular groove upon its outer surface, means for holding the work immovably within the apparatus, means for permitting both rotative and longitudinal motion of the loose sleeve during the turning and threading operations, and means carried by the loose sleeve comprising a slotted bar adapted to engage the groove in said fixed cylinder, guides within which said bar is longitudinally slidable and a nut and screw for tightening the bar in the guides to lock the sleeve against longitudinal motion at any desired point in its travel to permit of rotative motion only for the cutting operation.

2. In apparatus for holding, turning, threading and cutting pipes, and in combination, an outer loose sleeve carrying the tools, an inner fixed externally-grooved cylinder screw-threaded upon its outer surface carrying the work, means for holding the work immovably therein, a screw-threaded block carried by said loose sleeve, a nut and screw for lowering and raising said threaded block into and out of engagement with the threads upon the cylinder for permitting longitudinal motion of the sleeve when desired, and means carried by the sleeve comprising a slotted bar adapted to engage the groove in said fixed cylinder, guides within which said bar is longitudinally slidable and a nut and screw for tightening the bar in the guides to lock the sleeve against such longitudinal motion at any desired point of its travel to permit of rotative motion only for the cutting operation.

In testimony whereof I have hereunto set my hand in the presence of two subscribing witnesses.

MURRAY HINCKLEY SPEAR.

Witnesses:
I. E. LAWLER,
L. LAWLER.